United States Patent
Miyazawa

(10) Patent No.: US 6,464,317 B2
(45) Date of Patent: Oct. 15, 2002

(54) BATTERY POWERED PRINTER CAPABLE OF PRINTING IMAGE INFORMATION PICKED-UP AND STORED THROUGH AN ELECTRONIC IMAGE PICK-UP DEVICE

(75) Inventor: Azuma Miyazawa, Mitaka (JP)

(73) Assignee: Olympus Optical Co., Ltd. (JP)

(*) Notice: Subject to any disclaimer, the term of this patent is extended or adjusted under 35 U.S.C. 154(b) by 0 days.

(21) Appl. No.: 09/818,133

(22) Filed: Mar. 27, 2001

(65) Prior Publication Data

US 2002/0021320 A1 Feb. 21, 2002

(30) Foreign Application Priority Data

Aug. 21, 2000 (JP) ........................................ 2000-249920

(51) Int. Cl.⁷ ................................................ B41J 29/38
(52) U.S. Cl. ............................ 347/14; 347/3; 348/233; 396/321
(58) Field of Search ................................ 347/3, 14, 16, 347/19, 104, 109, 192, 195, 2; 358/1.14, 406, 906, 909.1; 320/134; 396/211, 321; 340/636; 348/233

(56) References Cited

U.S. PATENT DOCUMENTS

| | | | | |
|---|---|---|---|---|
| 4,728,978 A | * | 3/1988 | Inoue et al. | 396/211 |
| 5,182,583 A | * | 1/1993 | Horigome et al. | 347/19 |
| 5,182,655 A | * | 1/1993 | Motoyanagi | 358/406 |
| 5,631,677 A | * | 5/1997 | Horigome et al. | 347/19 |
| 5,673,070 A | * | 9/1997 | Nakanishi et al. | 347/19 |
| 5,714,994 A | * | 2/1998 | Suzuki et al. | 347/190 |
| 5,822,600 A | * | 10/1998 | Hallowell et al. | 395/750.08 |
| 6,067,171 A | * | 5/2000 | Yamada et al. | 358/406 |
| 6,144,725 A | * | 11/2000 | Kurosawa et al. | 379/100.05 |
| 6,241,351 B1 | * | 6/2001 | Stephenson | 347/109 |

FOREIGN PATENT DOCUMENTS

| | | |
|---|---|---|
| JP | 4-249466 | 9/1992 |
| JP | 09-303369 | 11/1997 |
| JP | 10-250190 | 9/1998 |

* cited by examiner

Primary Examiner—John Barlow
Assistant Examiner—Blaise Mouttet
(74) Attorney, Agent, or Firm—Straub & Pokotylo; John C. Pokotylo

(57) ABSTRACT

A CPU mounted on a printer according to the present invention decides whether at least one sheet can be printed based on a battery capacity detected from a battery controller through a battery check section before a printing operation in a DPOF mode is started, for example, stores, in print history information memory, print history information indicative of a printed frame number and the number of prints in a print scheduling frame number and the number of prints which are set to print control information if it is decided that one sheet cannot be printed due to an insufficient capacity and once interrupts the printing operation. Then, the battery is exchanged with a new battery or is charged. Thereafter, the CPU is operated to read the print history information and restart the printing operation from the number of non-prints corresponding to the print scheduling frame number interrupted based on the history information thus read.

12 Claims, 8 Drawing Sheets

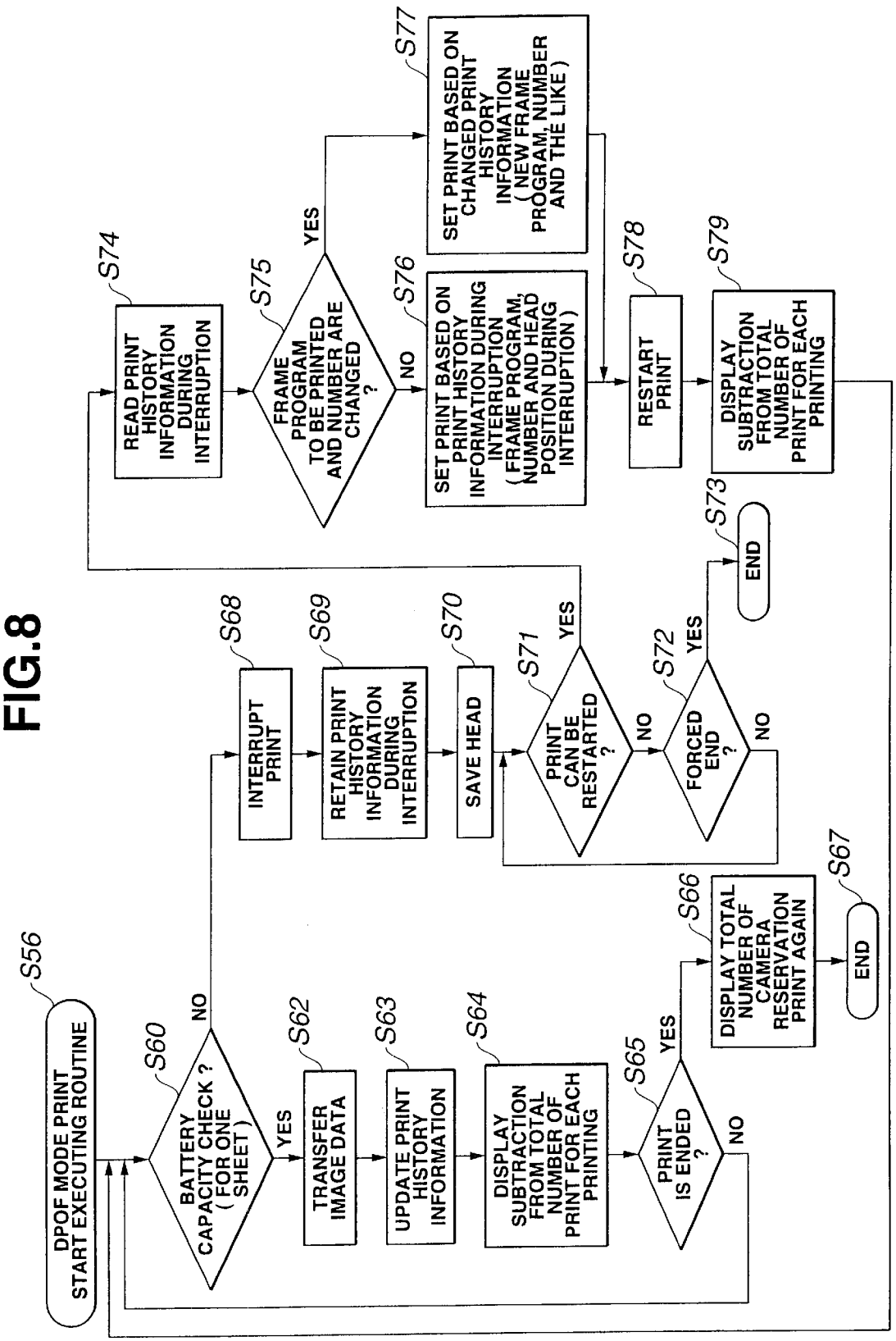

BATTERY POWERED PRINTER CAPABLE OF PRINTING IMAGE INFORMATION PICKED-UP AND STORED THROUGH AN ELECTRONIC IMAGE PICK-UP DEVICE

This application claims benefit of Japanese Application No. 2000-249920 filed in Japan on Aug. 21, 2000, the contents of which are incorporated by this reference.

BACKGROUND OF THE INVENTION

1. Field of the Invention

The present invention relates to a printer comprising a removable battery as a power source for a printing operation, and more particularly to a printer capable of enhancing printing performance and operability and reducing a size at a low cost by interrupting or restarting the printing operation depending on the presence of a battery capacity capable of carrying out printing for one sheet.

2. Related Art Statement

In recent years, a personal computer and a video recorder have spread widely and various printers capable of recording images of these apparatuses have also been proposed and demanded increasingly. For this reason, an inexpensive printer capable of producing printed images of high quality has been desired, and furthermore, a small-sized light and portable printer has also been demanded greatly such that it can carry out printing as a mobile printer.

With such a demand, recently, there have been proposed various printers capable of attaching and removing a memory card storing data to be printed such as image information and of printing the image information stored in the memory card. In particular, a printer capable of writing, into the memory card, print control information about image data to be printed, that is, print control information referred to as so-called DPOF (Digital Print Order Format) and of carrying out print-out based on the print control information automatically prints images (frames) every predetermined sheets based on the print control information. Therefore, it is not necessary to constrain an operator for a long period of time. Moreover, a PC for controlling print directing operation is not required for a system. Therefore, this printer is very effective for an enhancement in the performance of an apparatus and a reduction in the size of the apparatus and will be expected in the future.

In a printer comprising a battery which can be provided in a body or attached and removed to and from the body as power supplying means required for the printing operation, there is a possibility that the printing operation might be interrupted with a decrease in a battery capacity. In such a case, the printing operation is required again after the exchange or charging of the battery. As a result, a time required for the printing operation is wasted.

In consideration of such drawbacks of the conventional art, for example, Japanese Patent Application Laid-Open No. 10-250190 has described an image processing system.

In the image processing system according to this proposal, the following operation is carried out in order to save the time required for the printing. More specifically, the capacity of a battery of a digital camera to be a power is first checked when the printing is executed in an ink jet printer. If it is decided that the battery capacity is equal to or smaller than a predetermined value, the printing operation is interrupted and interruption position data on the printer side are retained. Then, when the printing is restarted within for a predetermined period by exchanging or charging the battery, the interruption position data are transmitted from the printer to the digital camera so that a head is driven from a save position to an interruption position and the printing is thus restarted.

In the image processing system described in the Japanese Patent Application Laid-Open No. 10-250190, however, it is decided only whether the battery capacity is equal to or smaller than the predetermined value. Therefore, the capacity becomes insufficient in the middle of the printing. In this case, a position where the printing is restarted through the exchange or charging of the battery is a position where the printing is interrupted. Therefore, if the position of the head is not reliably controlled, the print position such as a character position is shifted. As a result, there is a possibility that printing performance might be adversely affected. To the contrary, it is necessary to provide preventing means such as an electronic circuit part capable of preventing the shift in a print position. Therefore, there has been a problem in that the cost is increased and the size of the apparatus is increased. Moreover, there has been a problem in that a recording paper which is being printed should be maintained to be attached to the printer during the exchange or charging of the battery, resulting in a deterioration in operability.

OBJECT(S) AND SUMMARY OF THE INVENTION

It is an object of the present invention to provide a printer capable of interrupting or restarting a printing operation depending on the presence of a battery capacity for one-sheet printing, thereby enhancing printing performance and operability and reducing a size at a low cost.

In brief, the present invention which is a printer capable of printing image information picked-up and stored through an electronic image pick-up device provides a battery for supplying a power to each function;

battery check means for detecting a battery capacity before a printing operation is started and for deciding whether at least one sheet can be printed or not;

storing means for storing a frame number at which the printing operation is interrupted and the number of non-prints corresponding thereto if it is decided that one sheet cannot be printed due to an insufficient capacity; and print control means for exchanging the battery with a battery to at least clear check through the battery check means or charging the battery to at least clear the check through the battery check means, and then restarting the printing operation from the number of non-prints corresponding to the interrupted frame number.

These object(s) and advantages of the present invention will become further apparent from the following detailed explanation.

BRIEF DESCRIPTION OF THE DRAWINGS

FIG. 8 is a flow chart showing an example of a print starting execution processing routine of FIG. 7 which is a feature of the present invention.

DETAILED DESCRIPTION OF THE PREFERRED EMBODIMENTS

An embodiment of the present invention will be described below with reference to the drawings.
(Structure)

Figure 1:
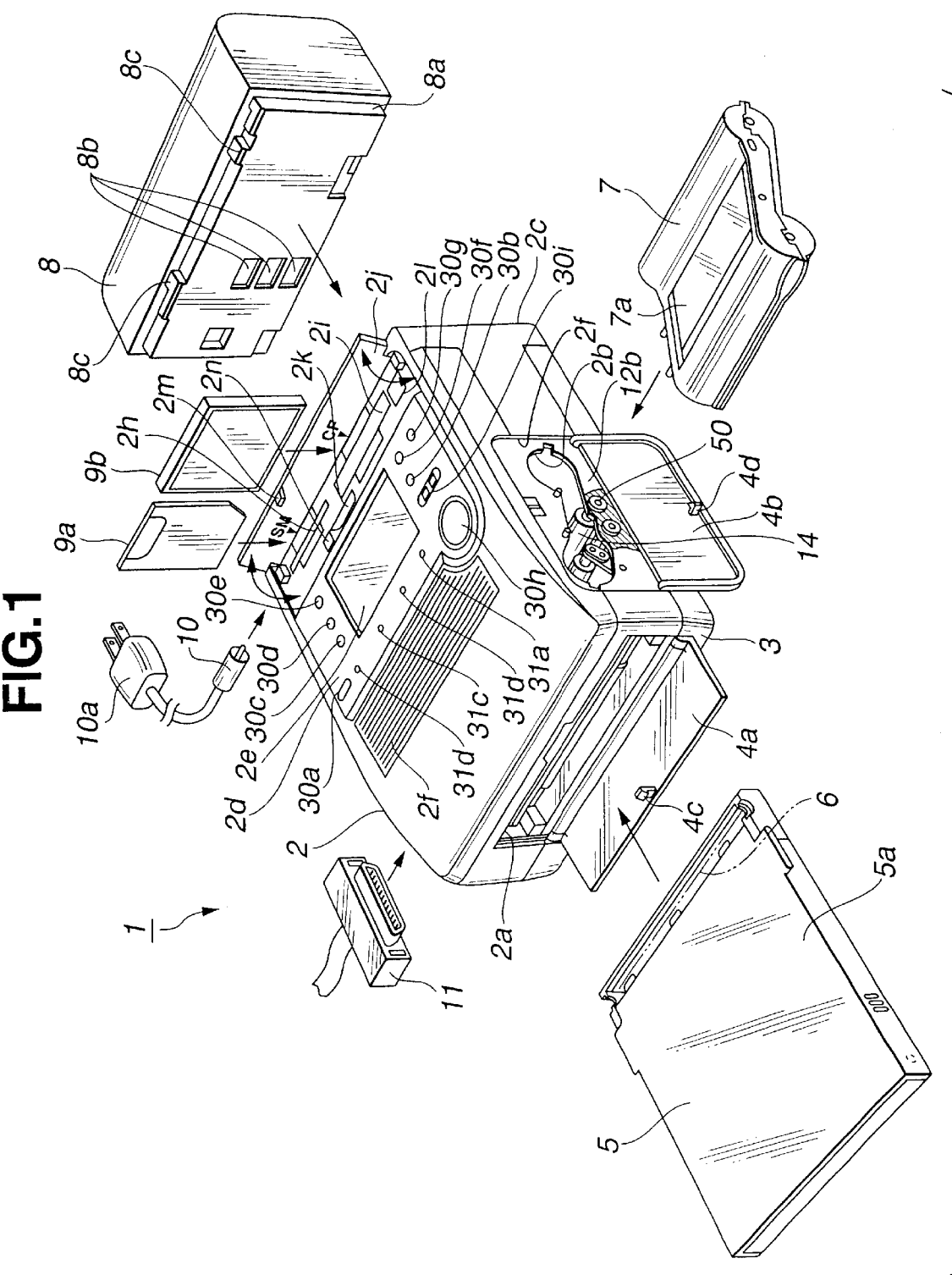
FIG. 1 is a perspective view showing the schematic structure of a printer to which the present invention is applied.
Figure 2:
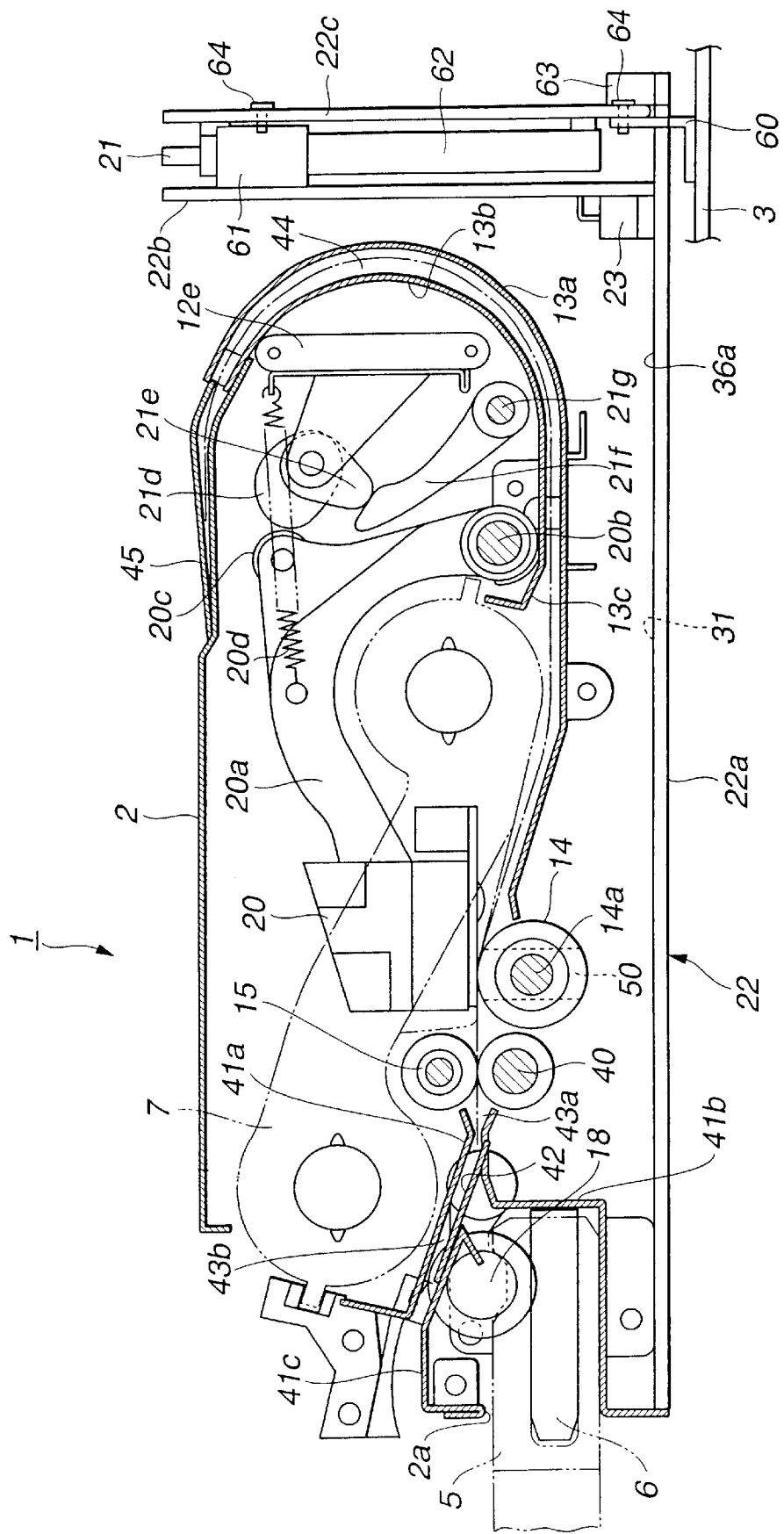
FIG. 2 is a sectional view showing the structure of a main part of the printer illustrated in FIG. 1.

FIGS. 1 and 2 are views illustrating the schematic structure of a printer to which the present invention is applied, FIG. 1 being a perspective view showing the whole structure of the apparatus and FIG. 2 being a sectional view showing the structure of a main part of the apparatus.

As shown in FIG. 1, a printer 1 according to the present embodiment has such a structure that a body cover 2 accommodating various mechanical mechanism, components, boards and the like which are required for a print function and a body bottom portion 3 attached to the lower portion of the body cover 2 form a housing, thereby constituting the main appearance portion of the apparatus 1.

The body cover 2 on the front side (front left side in FIG. 1) of the apparatus 1 is provided with a paper feeding cassette attachment opening 2a for attaching a paper feeding cassette 5 capable of accommodating a plurality of recording papers 6. The paper feeding cassette 5 is removably attached through the paper feeding cassette attachment opening 2a.

In a corresponding portion of the body bottom portion 3 is provide a closing cover 4a for closing the paper feeding cassette attachment opening 2a when the paper feeding cassette 5 is removed from the apparatus. The closing cover 4a is provided with lock means 4c for holding the closing state during the closing, and the closing cover 4a is locked through the lock means 4c and engaging means (not shown) provided in a corresponding position of the body cover 2.

An opening 2f is formed on the right side surface seen from the front side of the body cover 2. An ink cassette insertion port 2b for attaching an ink cassette 7 having an ink ribbon 7a wound thereon is formed in a main frame 12b exposed through the opening 2f and provided in the apparatus. The ink ribbon 7a is obtained by sequentially and repetitively coating a thermal transfer ink having a plurality of colors such as yellow (Y), magenta (M), cyan (C), an ink (OP) for transparent overcoat.

Moreover, an open cover 4b for closing the opening 2f is openably provided on the body cover 2. The closing cover 4b is provided with lock means 4d for holding the closing state during the closing in the same manner as the closing cover 4a, and is locked through the lock means 4d and the engaging means (not shown) provided in the corresponding position of the body cover 2.

A trench 2c for battery attachment for removably attaching a battery 8 as driving power supplying means required for carrying is formed in a portion on the back side (the right rear side in FIG. 1) of the body cover 2. An attachment portion 8a formed on the attachment surface of the battery 8 is fitted and fixed into the trench 2c for battery attachment. Moreover, an engaging portion 8c provided on the battery attachment portion 8a is engaged with the engaging means (not shown) provided in the corresponding position of the trench 2c for battery attachment. Consequently, the state of attachment of the battery 8 can be held.

Moreover, a plurality of battery cut pieces 8b for supplying power stored in the battery 8 into the apparatus 1 is provided on the surface of the attachment portion 8a of the battery 8. These battery cut pieces 8b come in contact with battery cut pieces (not shown) provided on the back side of the apparatus 1 and are thus conducted electrically when the battery 8 is attached to the trench 2c for battery attachment. Thus, the power can be supplied into the apparatus 1.

An operation panel 2d, a display section 2e, first and second memory card insertion ports 2h and 2i and the like are provided on the upper surface of the body cover 2. The operation panel 2d includes operation buttons 30a to 30i to be directing means for directing various control operation execution instructions for the apparatus 1, and display lamps 31a to 31d constituted by an LED (light emitting diode) for ON display related to the progress of the printing operation and the like.

The operation buttons 30a to 30i include a power button 30a for directing power ON and power OFF, a print button 30b for directing a printing operation, a print mode selecting button 30c for selecting a print mode (standard print, index print, full-frame print, DPOF print and the like), a sharpness button 30d for selecting a picture quality (standard, soft, sharp), a dividing button 30e for selecting the number of divisions of dividing print (no division, 2, 4, 9 and 16 screens), a date button 30f for specifying date print and date print display configuration, a card switching button 30g for switching the memory card 9, a frame number/print number switching button 30h for switching a print frame number specifying mode and a print number (copy number) specifying mode, a (+) button and (−) button 30i for increasing and decreasing the frame number or the number of prints, and the like.

Moreover, the display lamps 31a to 31d include a printing lamp 31a for ON displaying that the printing is being carried out, a ribbon/paper lamp 31b for ON displaying ink ribbon end, no paper feeding cassette, no recording paper and the like, an error lamp 31c for opening the closing cover of the ribbon cassette to ON display a communication error and the like, an access/charging lamp 31d for ON displaying that data are read (accessed) from the memory card 9 and that the charging is started when a power source is turned OFF through the power button 30a with a charging battery (not shown) and a DC connector 10 is connected, and the like.

Moreover, the display section 2e is provided in a notch portion in the operation panel 2d. The display section 2e is an LCD, for example, and displays the control processing contents for the printing operation to be carried out through the apparatus 1 (print mode execution configuration, picture quality mode specification, dividing mode specification, memory card switching specification, date print specification, date print display configuration/switching specification, file name, frame plate/print number specification, frame number or print number display or character display implying no DPOF setting, display of the residual quantity of the battery and the like). The details will be described below.

The first and second memory card insertion ports 2h and 2i are formed corresponding to sockets (not shown) provided in the body, respectively. Two different kinds of first and second memory cards 9a and 9b recording an image information signal (including print control information in some cases) are inserted through the first and second memory card insertion ports 2h and 2i, respectively. Moreover, the first and second memory cards 9a and 9b are removably attached to the corresponding sockets.

For example, a smart media (SM) is used as the first memory card 9a and a compact flash (CF) is used for the second memory card 9b. In the present embodiment, the type of the memory card and the number of the memory cards are not restricted but it is a matter of course that other memory cards and the like may be combined.

Thus, the first memory card 9a or the second memory card 9b are attached to slots (not shown) provided together with the first and second memory card insertion holes 2h and 2i. Consequently, it is possible to fetch an image information signal and print control information which are required for printing from any of the memory cards 9.

Moreover, a dust cover 2j for blocking the memory card insertion ports 2h and 2i is openably provided in the vicinity of the first and second memory card insertion ports 2h and 2i of the body cover 2. The end of the dust cover 2j is easily picked through a notch 2k provided in a predetermined portion of the body cover 2 so that the dust cover 2j can be opened easily. When the dust cover 2j is opened, the first and second insertion ports 2h and 2i are exposed. When the dust cover 2j is closed, an engaging click 2m protruded from an end on the opening side is engaged into an engaging hole 2n provided on the body side. By closing the dust cover 2j, a dust or the like can be prevented from entering.

Moreover, an eject button 21 for ejecting the second memory card 9b such as a compact flash is provided in the vicinity of the second memory card insertion port 2i. In the case in which the second memory card 9b is to be ejected, eject button 21 is pressed down so that the second memory card 9b is ejected.

On the other hand, a DC connector 10 for converting an ordinary AC power into a direct current (DC) and supplying the direct current into the apparatus 1 is removably attached to the read end of a side surface on the reverse side where the ink cassette insertion port 2b of the body cover 2 is provided. The DC connector 10 serves to fetch a general AC power through an AC plug socket 10a, to convert the AC power thus fetched into a DC power (DC) through an AC/DC converter (not shown) in the AC plug socket 10a or between the AC plug socket 10a and the DC connector 10, and to supply the DC power as a driving power of the apparatus 1 into the apparatus 1.

In the printer 1 according to the present embodiment, moreover, the image information signal can be fetched through the first and second memory cards 9a and 9b, and furthermore, an image information signal can also be fetched from a personal computer, a video recorder reproducing apparatus and the like, for example. In other words, a PC connector (not shown) capable of removably attaching a PC connector 11 connected to the personal computer, the video recording reproducing apparatus and the like is provided in a portion on this side of the side surface of the body cover 2. In the printer 1 according to the present embodiment, accordingly, various image information signals can be fetched through the PC connector 11 connected to various image apparatuses as well as the first and second memory cards 9a and 9b. Therefore, the range of use can be increased.

Furthermore, the paper feeding cassette 5 to be used for the printer 1 can accommodate a plurality of recording papers 6 and has a removable cover 5a provided on an upper surface thereof. The cover 5a is formed with a tip portion on the insertion side of the paper feeding cassette 5 cut away, and the uppermost layer of a plurality of the recording papers 6 accommodated through the cut portion is exposed. When the paper feeding cassette 5 is to be inserted, a paper feeding roller (not shown) provided in the apparatus 1 through positioning by the tip portion of the paper feeding cassette 5 abuts on one of the recording papers 6 exposed from the cut portion of the cover 5a and is thus rotated so that the recording paper 6 can be reliably delivered into the apparatus 1.

On the other hand, a board 22 is provided on the bottom face side of the printer 1 as shown in FIG. 2, and is constituted by a control board 22a mounting at least one of a circuit group required for a printing operation, for example, an IC circuit (not shown) for recording paper feeding control and an IC circuit (not shown) for ink ribbon feeding control, a power board 22b attached to the control board 22a to be provided on one of side surface sides of the printer 1 and including a charging circuit capable of charging the battery 8 and the like, and a medium socket unit board 22c arranged on the back side of the power board 22b, to which slots 82a and 82b for attaching the first and second memory cards 2h and 2i are fixed.

The control circuit board 22a and the power board 22b are connected and fixed to each other by connecting one end side of the power board 22b to a connector 23 to be connecting means which is provided on one end side of the control circuit card 22a as shown. Moreover, the control circuit board 22a and the medium socket unit board 22c are connected and fixed to each other by connecting one end side of the medium socket unit board 22c to a connector 63 to be connecting means provided on one end side of the control circuit board 22a. In other words, each board is thus fixed so that the whole board 22 is constituted to have an almost L shape. Consequently, it is possible to obtain an arrangement suitable for reducing the size of the apparatus.

Moreover, a circuit group required for a printing operation, for example, a circuit such as an IC circuit for recording paper feeding control, an IC circuit for ink ribbon feeding control, a video signal processing circuit which is not shown is mounted on the control board 22a. In addition, a PC connector for removably attaching the PC connector 11 is provided at the side end on the control board 22a. Furthermore, a plurality of connectors (not shown) to be electrically connected to various electronic parts (not shown) mounted on the apparatus are provided at the side end of a front face on the control board 22a. These circuits and connectors are electrically connected through a print pattern 31 provided based on the wiring configuration required for the control board.

While the power board 22b is constituted to have an L shape together with the control board 22a through the connector 23, it is electrically connected to various electronic parts on the control board side through the connector 23. Moreover, a charging circuit for charging the battery 8, a thermal head 20, a control IC circuit for controlling a thermal head driving mechanism and the like which are not shown are provided on the internal surface of the power board 22b. Furthermore, a connector (not shown) for electrical connection to not shown a thermal head driving mechanism, a large-sized capacitor and the like is provided at the side end of a side surface of the power board 22b.

On the other hand, a socket (not shown) for the first memory card and a socket 82b for the second memory card are attached to the inside of the medium socket substrate 22c through an attachment member 61 as shown in FIG. 2. The attachment member 61 is fixed to the power board 22b and a base end of the attachment member 61 is screwed to the medium socket board 22c with a screw 64, thereby fixing each socket.

Moreover, the medium socket unit board 22c is fixed is fixed, with the screw 64, to a support member 60 having a base end attached onto the surface of the body bottom portion 3 in order to maintain some strength against press force generated with attachment of various memory cards. In other words, the medium socket unit board 22c is attached to the support member 60. Consequently, it is possible to prevent the apparatus from being broken due to the press force generated with the attachment of various memory cards 9a and 9b.

A connection member electrically connected to the charging circuit of the power board 22b is provided on the back side of the medium socket unit board 22c, which is not shown. The connection member is provided with a battery cut piece to be protruded for electrically connecting in contact with the battery cut piece 8b of the battery 8. Accordingly, in the case in which the battery 8 is attached to the trench 2c for battery attachment of the body cover 2, the battery cut piece of the connection member comes in contact with the battery cut piece 8b of the battery 8 and they are thus conducted. Consequently, the power of the battery 8 can be supplied into the body of the printer 1.

With the above-mentioned structure, a wiring length can be shortened and the size and weight of the printer can be reduced. Thus, an optimum printer for carrying can be constituted. In consideration of the process for manufacturing a board, moreover, a work for manufacturing the board can be carried out separately and an assembling step can also be performed easily because the board 22 is constituted by three boards 22a, 22b and 22c. Consequently, the manufacturing process can be simplified and a cost can be reduced greatly.

The basic operation of the printer having the above-mentioned structure will be described with reference to FIG. 2.

As shown in FIG. 2, first of all, the recording paper 6 to be the uppermost layer accommodated in the paper feeding cassette 5 is transferred into the printer 1 through the paper feeding roller 18. At this time, the base end of the paper feeding cassette 5 on the printer side is constituted have a round shape. Therefore, the recording paper 6 can be smoothly transferred through the rotation of the paper feeding roller 18.

Guide plates 41a, 41b and 41c forming recording paper delivery paths 43a and 43b attached to a main frame are provided in the front stages of a pinch roller 15 and a grip roller 40 which are provided on the forward portion of in the apparatus. The recording paper 6 transferred through the paper feeding roller 18 is transferred between the pinch roller 15 and the grip roller 40 through the formed delivery path 43a while pushing up a tape member 42 attached to the guide plate 41c.

At this time, it is detected that the recording paper 6 is normally delivered or not through a sensor acting as a recording paper delivery position detecting section attached to the vicinity of the recording paper delivery path of the guide plat 41b, which is not shown, and it is determined whether or not the printing operation is started through a main control section (a CPU 81, see FIG. 3) provided on the control board 22a depending on the result of the detection. If the recording paper 6 is not normally delivered, the CPU 81 causes the display section 2e on the body cover 2 surface to carry out error display or the like. If not so, the CPU 81 carries out driving control to start the printing operation.

When the printing operation is started, the recording paper 6 is held between the pinch roller 15 and the grip roller 40 and the CPU 81 controls the driving operation of the recording paper feeding/ribbon feeding mechanism so that the delivery of the recording paper 6 during the printing is regulated through the rotation of the grip roller 40 having non-slip means provided on a surface thereof. In other words, the tip portion of the recording paper 6 is delivered through the recording paper delivery path 44 formed by the guide plates 13a and 13b and the delivery of the recording paper 6 is controlled such that the rear end portion of the recording paper 6 reaches print start points of the thermal head 20 and a platen roller 14.

During the printing, the recording paper 6 and the ink ribbon 7a are pressed between the thermal head 20 and the platen roller 14 and are thus transferred through the rotation of the grip roller 40 and the pinch roller 15 and a current is caused to flow to the heating unit of the thermal head 20 through a control circuit provided on the power board 22b. Consequently, the thermal transfer ink of the ink ribbon 7a is dissolved or sublimated, and is thus transferred to the recording paper 6, thereby carrying out the printing. At the same time, the feeding operation of the ink ribbon 7a required for the printing is also controlled through a circuit for ink ribbon feeding control during the printing.

In this case, when a first color of yellow (Y) of the ink ribbon 7a is to be printed on the recording paper 6, the recording paper 6 is transferred in a left direction in the drawing through the pinch roller 15 and the grip roller 40, and the recording paper 6 and the ink ribbon 7a are pressed between the thermal head 20 and the platen roller 14 and is thus transferred to supply an image information signal according to the yellow (Y) to the heating unit (not shown) of the thermal head 20.

At this time, the tip portion of the recording paper 6 is placed in the recording paper delivery path 44 constituted by the U-shaped guide plate 13a and the guide plate 13b having the same shape which is provided in the guide plate 13a. On the other hand, the rear end portion of the recording paper 6 is transferred to the recording paper delivery path 43b while pressing down the tape member 42 attached to the guide plate 41c through the delivery path 43a. Thus, the first color is printed.

The position of the thermal head 20 during the printing can be switched into three positions, for example, (a position shifted upward, a position shifted downward as shown in the drawing, and a partial position a standby state to be their neutral position) through the thermal head driving mechanism, and the position is controlled by the CPU 81 according to the printing operation.

When the first color of yellow (Y) is completely printed on the recording paper 6, the CPU 81 controls the driving operation of the thermal head driving mechanism (not shown) and moves the thermal head 20 to the partial position apart from the platen roller 14 side, while the pinch roller 15 and the grip roller 40 return the recording paper 6 toward the rear side of the printer 1 (in a right direction of the drawing).

Next, the above-mentioned is repeated to sequentially superpose each color on the recording paper 6 in order of a second color of magenta (M), a third color of cyan (C) and transparent overcoat (OP), thereby carrying out color printing.

Before each color is started to be printed, the recording paper 6 is moved toward the rear side of the printer 1 (in the right direction of the drawing) through the grip roller 40 and the pinch roller 15. At this time, the tip portion of the recording paper 6 is guided and moved into the recording paper delivery path 44 of the U-shaped guide plates 13a and 13b. When the rear end portion of the recording paper 6 is detected through a sensor which is not shown, the rear end of the recording paper 6 is set to the print start positions of the thermal head 20 and the platen roller 14 through the rotation control of the pinch roller 15 and the grip roller 40 based on the result of the detection.

Moreover, in the case in which the contact position of the platen roller 14 is not normal with respect to the heating resistor of the thermal head 20 but is shifted when the heating resistor of the thermal head 20 is to transfer each thermal transfer ink of the ink ribbon 7a to the recording paper 6, a pair of bushes 50 corresponding to the shift are selected and exchanged so that the central position of the rotary shaft of the platen roller 14 can be decentered to adjust the position to a normal position.

When all the colors are printed completely, the recording paper 6 thus printed is discharged to the outside of the apparatus through the recording paper delivery path 43b through a paper feeding mechanism for discharge which is not shown.

Thus, the printing operation is completed. The discharge of the recording paper 6 which is carried out after the printing operation is completed is detected through another sensor acting as the recording paper delivery position detecting section. The result of the detection is supplied to the CPU 81 to recognize a timing in which one screen is printed completely.

In the above-mentioned printer, in the case in which print control information about the number of prints, that is, information about DPOF is written into the first memory card 9a or second memory card 9b to be mounted in the apparatus corresponding to an image information signal picked up and stored by an electronic image pick-up device, the print control information is read to execute the printing operation based on the print control information.

Thus, in the case in which a DPOF print mode is to be executed or a normal print mode is to be executed, it is only decided whether or not the battery capacity is equal to or smaller than the predetermined value as described above in the conventional art. Therefore, the capacity sometimes becomes insufficient in the middle of the printing. In this case, a position in which the printing is to be restarted through battery exchange or charging is a position in which the printing is interrupted. Therefore, if the position of the head is not reliably controlled, a print position such as a character position is shifted. As a result, printing performance might be adversely affected. To the contrary it is necessary to provide preventing means such as an electronic circuit part capable of preventing the shift in the printing position. Therefore, there has been a problem in that the cost is increased and the size of the apparatus is increased. Moreover, while the battery is to be exchanged or charged, the recording paper which is being printed should be attached to the printer. Therefore, there has been a problem in that operability is poor.

In the printer according to the present embodiment, in the case in which the DPOF print mode is to be executed or the normal print mode is to be executed, the battery capacity is detected before the printing is started and it is decided whether or not a least one sheet can be printed. If it is decided that one sheet cannot be printed due to an insufficient capacity, a printed frame number and the number of prints in a frame number for printing and the number of prints are stored and a battery is exchanged to at least clear battery check or the battery is charged to at least clear the battery check. Then, control is carried out such that the printing is restarted from the number non-prints corresponding to a frame number interrupted by deciding that the battery capacitor is insufficient based on the stored information. Consequently, it is possible to enhance printing performance and operability and to reduce the size at a low cost. An embodiment for implementing the foregoing is shown in FIGS. 3 to 8.

Figure 3:
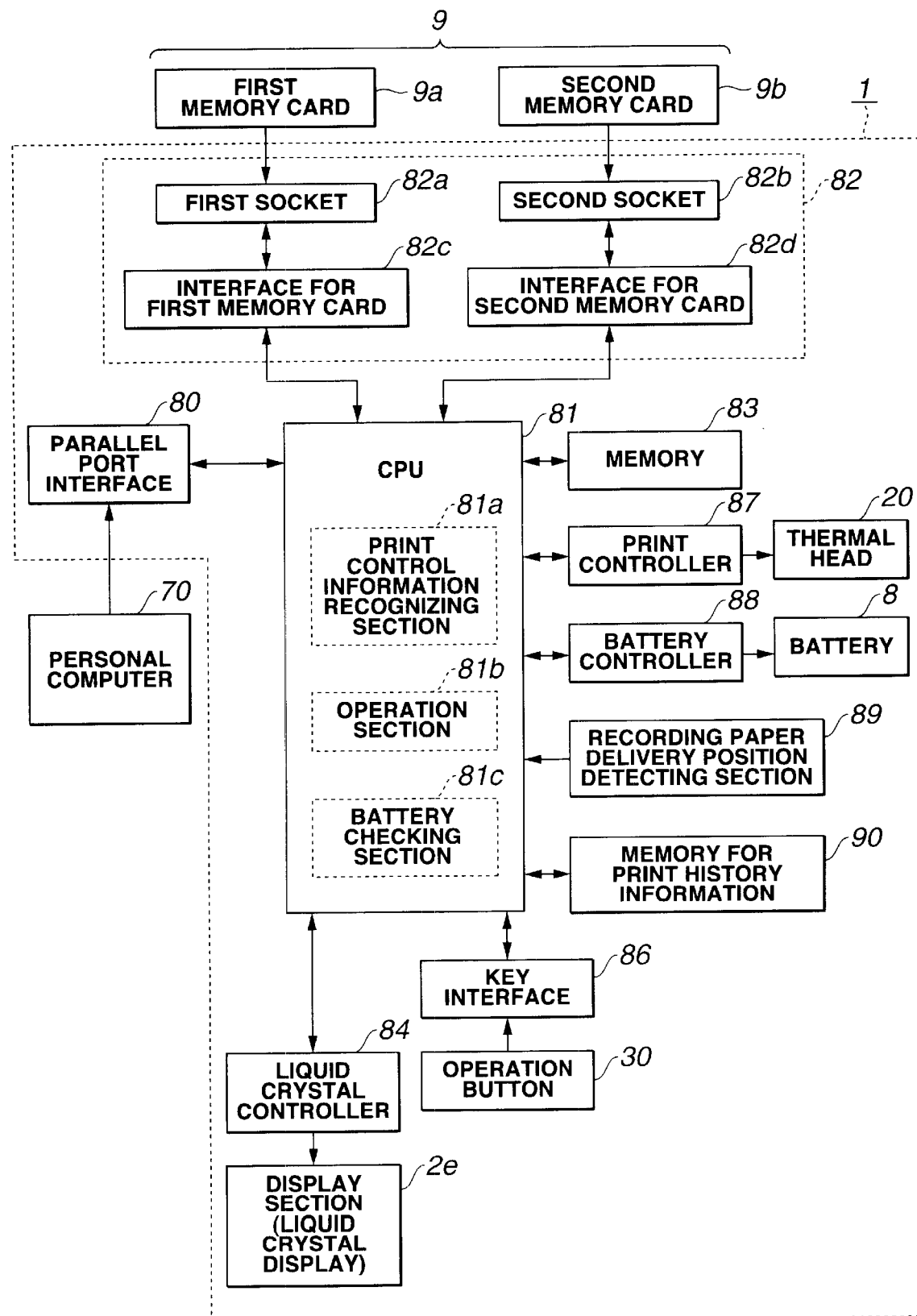
FIG. 3 is a block diagram showing the electrical circuit structure of a main part mounted on a printer according to an embodiment of the present invention.
Figure 4:
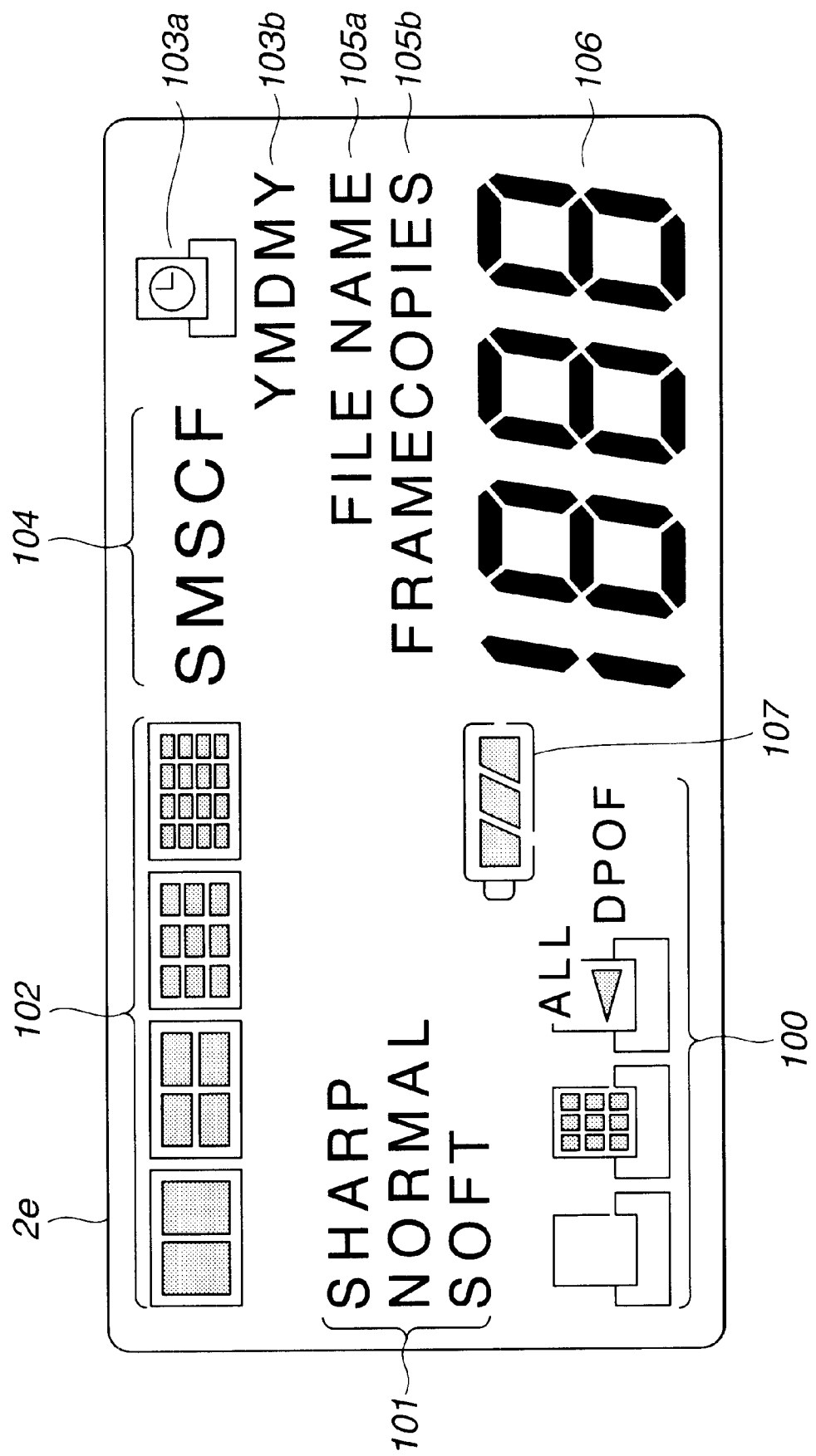
FIG. 4 is a diagram showing all display characters and display marks which can be displayed on a display section illustrated in FIG. 1.
Figure 5A:
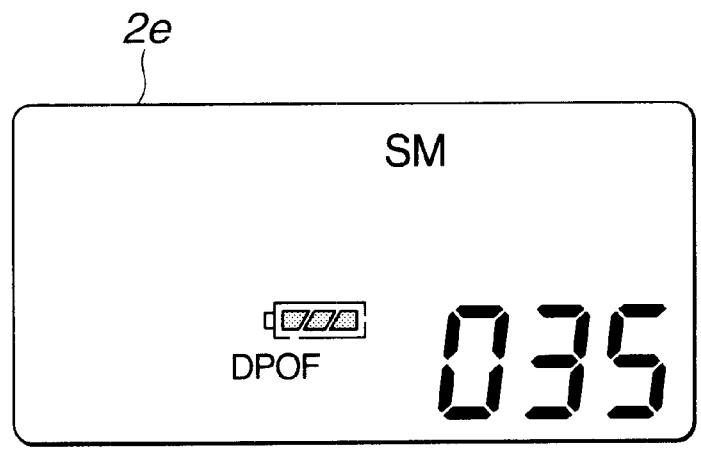
FIG. 5A is a diagram showing an example of display of the display section with DPOF set.
Figure 5B:
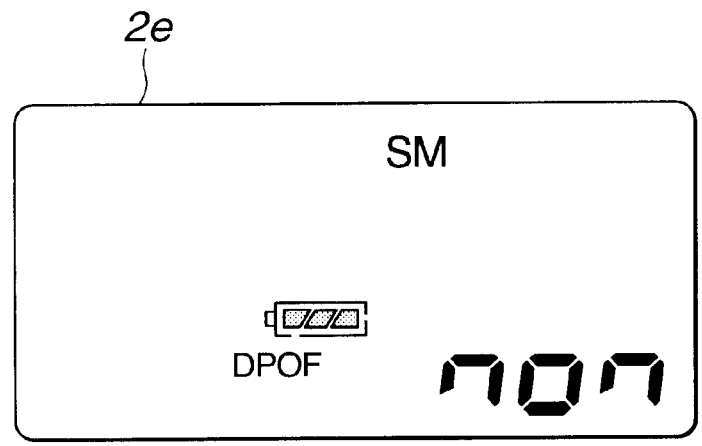
FIG. 5B is a diagram showing an example of display of the display section without the DPOF set.
Figure 6A:
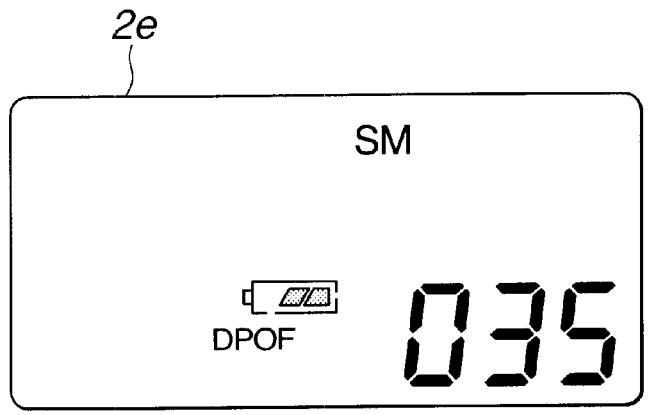
FIG. 6A is a diagram showing an example in which the total number is displayed on the display section when subtraction display is executed with a start of printing in the apparatus illustrated in FIG. 3.
Figure 6B:
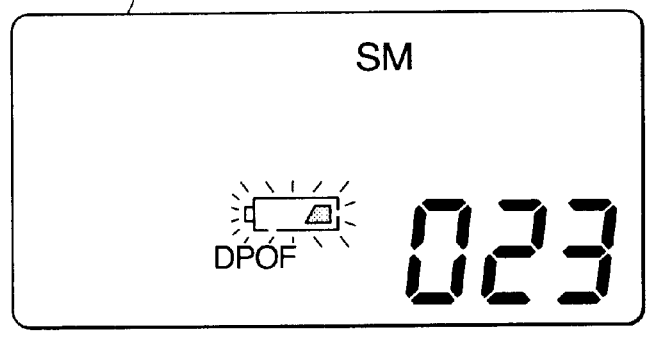
FIG. 6B is a diagram showing an example of the display section when the printing is interrupted in the apparatus illustrated in FIG. 3.
Figure 6C:
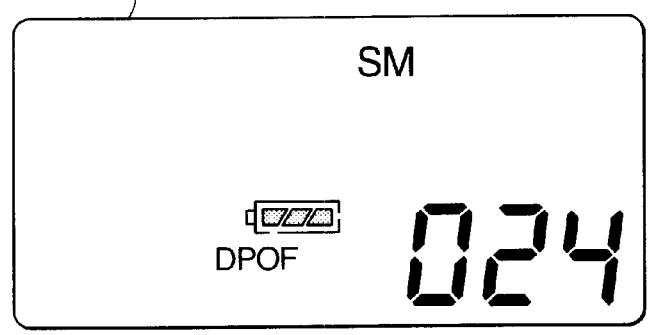
FIG. 6C is a diagram showing an example of the display section when the printing is restarted in the apparatus illustrated in FIG. 3.
Figure 6D:
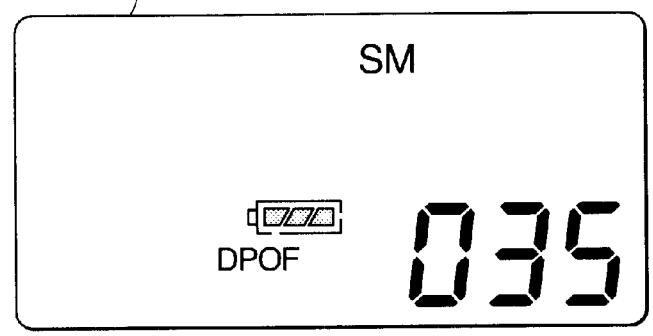
FIG. 6D is a diagram showing an example in which the total number is redisplayed on the display section when the printing is completed in the apparatus illustrated in FIG. 3.
Figure 7:
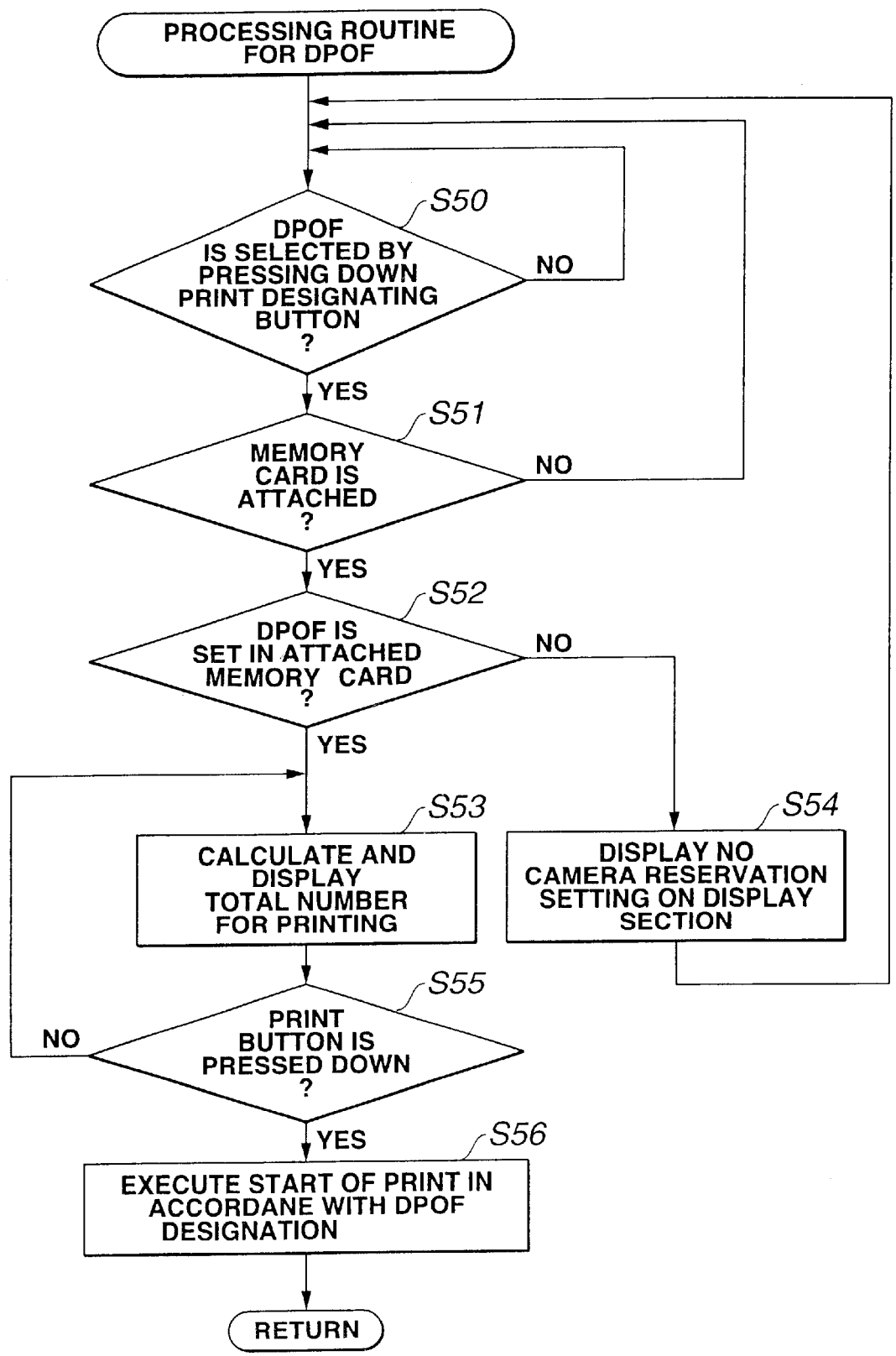
FIG. 7 is a flow chart showing an example of a main control operation through a CPU mounted in the apparatus illustrated in FIG. 3.

FIGS. 3 to 8 show an embodiment of a printer according to the present invention, FIG. 3 being a block diagram showing the electrical circuit structure of a main portion mounted on the apparatus illustrated in FIG. 1, FIG. 4 being a diagram showing all display characters and display marks which can be displayed on a display section, FIG. 5A being a diagram showing an example of display of the display section with DPOF set, FIG. 5B is a diagram showing an example of display of the display section without the DPOF set, FIG. 6A is a diagram showing an example in which the total number is displayed on the display section when subtraction display is executed with a start of printing in the apparatus illustrated in FIG. 3, FIG. 6B is a diagram showing an example of the display section when the printing is interrupted in the apparatus illustrated in FIG. 3, FIG. 6C is a diagram showing an example of the display section when the printing is restarted in the apparatus illustrated in FIG. 3, FIG. 6D is a diagram showing an example in which the total number is redisplayed on the display section when the printing is completed in the apparatus illustrated in FIG. 3, FIG. 7 is a flow chart showing an example of a main control operation through a CPU mounted in the apparatus illustrated, and FIG. 8 is a flow chart showing an example of a print starting execution processing routine of FIG. 7 which is a feature of the present invention.

In the printer 1 shown in FIG. 3, in the case in which the first memory card 9a of second memory card 9b storing print control information together with an print image information signal is to be attached to the print control mode reading section 82 and to execute the DPOF print mode of the normal print mode is to be executed, the battery capacity is detected before the printing is started and it is decided whether or not a least one sheet can be printed. If it is decided that one sheet cannot be printed due to an insufficient capacity, a print scheduling frame number and the number of prints in a frame number for printing and the number of prints are stored and a battery is exchanged to at least clear battery check or the battery is charged to at least clear the battery check or an AC adaptor is connected. Then, control is carried out such that the printing is restarted from the number non-prints corresponding to a frame number interrupted by deciding that the battery capacitor is insufficient based on the stored information. In addition, there is shown a main structure for executing the display with the control operation.

As shown in FIG. 3, the printer 1 comprises a parallel port interface 80, a CPU 81 acting as print control means, a print control mode reading section 82, a memory 83, a liquid crystal controller 84, an operation button 30 and a key interface 86 acting as print scheduling frame number setting means and print number setting means, a print controller 87, a battery controller 88, a recording paper delivery position detecting section 89, a print history information memory 90, a thermal head 20, a battery 8 and a display section 2e.

The parallel port interface 80 is communicating means connected to a personal computer 70 and serving to receive and transmit electronic data from and to the personal computer 70. In the case in which a printing object image signal is to be fetched from the personal computer 70, it is fetched into the apparatus through the parallel port interface 80.

The print control mode reading section 82 serves to removably attach the memory card 9, that is, either of the first and second memory cards 9a and 9b, thereby reading a printing object image signal, print control information and the like from the memory card 9 into the apparatus or writing them into the memory card, and has first and second sockets 82a and 82b and interfaces 82c and 82d for the first and second memory cards.

The first memory card 9a (SM) is removably attached to the first socket 82a, and the printing object image signal and the print control information which are stored in the first memory card 9a are fetched into the CPU 81 through the interface 82c for the first memory card which is to be electrically connected to the first socket 82a. Moreover, the interface 82c for the first memory card can also supply an image information signal for carrying out writing into the first memory card 9a or the like through the first socket 82a.

Moreover, the second memory card 9b (CF) is removably attached to the second socket 82b, and the printing object image signal and the print control information which are stored in the second memory card 9b are fetched into the CPU 81 through the interface 82d for the second memory card which is to be electrically connected to the second socket 82b. Furthermore, the interface 82d for the second memory card can also supply an image information signal for carrying out writing into the second memory card 9b or the like through the second socket 82b.

The memory 83 is storing means for reading and storing a printing object image signal sent from the first or second memory card 9a or 9b or data transmitted from the personal computer 70 under control of the CPU 81.

The liquid crystal controller 84 serves to supply a liquid crystal display signal and a liquid crystal control signal to the display section 2e (a liquid crystal display, for example, an LCD) to be display means, thereby controlling a display image in the display section 2e under control of the CPU 81.

The key interface 86 serves to transmit an indication signal from the operation button 30 to the CPU 81. For example, when the DPOF mode is selected by pressing down the print mode specifying button 30c, an indication signal indicative of the execution of the DPOF mode is supplied to the CPU 81.

The print controller 87 supplies a printing signal and a print control signal to the thermal head 20 to control the printing operation and to control the driving operation of a recording paper feeding/ribbon feeding mechanism (not shown) corresponding to the printing operation.

Moreover, the battery controller 88 serves to supply power to the CPU 81 and the battery capacity of the battery 8 is detected before the printing is started, and transmits battery residual amount information thus detected to the CPU 81.

The recording paper delivery position detecting section 89 is constituted by a plurality of sensors provided in the vicinity of sucking and discharge positions for the recording paper 6 which are placed on the recording paper delivery path. Each timing signal is obtained based on the sucking and discharge timings of the recording paper 6 through these sensors and is then supplied to the CPU 81.

In the case in which it is decided that one sheet cannot be printed through the decision of the presence of a battery capacity capable of printing at least one sheet through the battery check portion 81c of the CPU 81 during the execution of the printing, the print history information memory 90 stores print history information indicative of a printed frame number and the number of prints in a print scheduling frame number and the number of prints which are set based on the print control information, for example. The print history information is written and read to and from the print history information memory 90 under control of the CPU 81.

The CPU 81 to be print control means includes at least a print control information recognizing section 81a, an operating section 81b and a battery check section 81c therein. The CPU 81 serves to control decoding of communication data transmitted from the personal computer 70, decoding of operation data transmitted form the keyboard 86, decoding of print control information transmitted from the first or second memory card 9a or 9b, storage of printing object image data transmitted from the personal computer 70 or the first and second memory cards 9a and 9b in the image memory 83, display on the display section 2e, printing an image of the thermal head 20, the driving operation of recording paper feeding/ribbon feeding mechanism which is not shown, the calculation of the residual amount of the battery 8 and decision of precision of a battery capacity for one print sheet, storage and reading of the print history information to the print history information memory during the interruption or restart of the printing due to an insufficient battery capacity, and the like.

Referring to the control of decoding of the print control information transmitted from the first or second memory card 9a or 9b and the control of display on the display section 2e, for example, the CPU 81 causes the print control information recognizing section 81a to recognize image information transmitted from the memory card 9 and a frame number in which the print control information is written, and the operating section 81b to calculate the total number of prints from the number of prints set to each frame number in which the print control information is written based on the result of the recognition and a default value present to the frame number to which the print control information is not set, controls to display the total number of prints on the display section 2e and controls to subtract the total number of prints with advance of the printing operation after the printing is started and display a subtraction value thus obtained in count-down on the display section 2e.

Furthermore, when executing the DPOF mode or the another print mode, the CPU 81 decided whether or not at least one sheet can be printed based on the battery capacity detected from the battery controller 88 through the battery check section 81c. If it is decided that one sheet cannot be printed due to an insufficient capacity, for example, the CPU 81 stores, in the print history information memory 90, print history information indicative of a print scheduling frame number set by the print control information and the number of prints in a frame number for printing and the number of prints are stored and a battery is exchanged to at least clear check through the battery check section 81c or the battery is charged to at least clear the check through the battery check section 81c, and then controls the print controller 88 to read the information stored in the print history information memory 90 and to restart the printing based the number of non-prints corresponding to a frame number interrupted by deciding that the battery capacitor is insufficient based on the read information.

When it is decided that the battery capacity is insufficient based on the decision of the battery check section 81c, the CPU 81 controls the print controller 88 to interrupt the printing operation and controls the liquid crystal controller 84 to turn OFF the display on the display section 2e.

Moreover, in the case in which the printing is to be restarted after newly exchanging or charging the battery 8, the CPU 81 reads the print history information and decides whether or not the print scheduling frame number to be restarted through the operation button 30 to be the print scheduling frame number setting means and the print number setting means and number of prints are changed, and controls the print controller 88 to restart the printing based on the print history information as a result of the decision.

Furthermore, when attaching the memory card 9 in which the print control information is written together with the image information, the CPU 81 carries out control to automatically set the print scheduling frame number and the number of prints based on the print control information.

In the printer 1 according to the present embodiment, the display control of the CPU 81 can cause the display section 2e to display the display characters and the display marks shown in FIG. 4.

In the example of display shown in FIG. 4, a print mode specifying display section 100 can indicate print mode specification and can carry out switching and display through the print mode button 30c. A picture quality mode specification display section 101 can indicate picture quality mode specification and can carry out switching and display through the sharpness button 30d. A dividing mode specifying display section 102 can indicate dividing mode specification and can carry out switching and display through the dividing button 30e. A date specifying display section 103a and a date print display configuration switching specification display section 103b can indicate date specification and print display configuration switching specification and can carry out switching and display trough the date button 30f. A memory card specification display section 104 can indicate memory card switching specification and can carry out switching and display through the card switching button 30d. A file name display section 105a and a frame number/print number specification display section 105b indicate file name specification and frame number/print number specification and can carry out switching and display through the frame number/print number switching button 30h. A frame number or print number display section 106 can display a frame number or the number of prints and can carry out switching and display through a (+) button (−) botton 30i. The display switching in these display sections is carried out if necessary. Moreover, a battery residual amount display section 107 indicates the residual amount of a battery and the display thereof is controlled through the control of the CPU 81. (Function)

The control operation to be a feature of the printer shown in FIG. 3 will be described below in detail with reference to FIGS. 5 to 8.

In the printer 1, a series of basic operations related to the print illustrated in FIG. 2 are controlled based on a main routine of the CPU 81. In an operation state on the main routine, for example, it is assumed that the DPOF mode is selected and executed when a user properly presses down the print mode button 30c in the operation button 30. Consequently, the operation button 30 outputs, to the interface 86, an indication signal indicative of the DPOF mode execution. Then, the indication signal received by the interface 86 is fetched into the CPU 81 and the CPU 81 recognizes the indication signal to activate a processing subroutine for the DPOF print execution shown in FIG. 7.

First of all, the CPU 81 decides whether or not a print mode to be selected and executed by the press down of the print mode button 30c is DPOF in the decision processing at a step S50. If the DPOF mode is selected, the processing proceeds to a next step S51. If not so, the processing is returned to the step S50 again where the decision is repeated until the DPOF mode is selected.

In the decision processing at the step S51, it is decided whether the memory card 9 is attached to the socket or not. In other word, it is decided whether or not the first memory card (SM) 9a is attached to the first socket 82a or the second memory card (CF) 9b is attached to the second socket 82b. If either of the memory cards 9 is attached to the corresponding socket, a printing object image signal and print control information which are stored in the corresponding memory card 9 are fetched into the CPU 81 through the interface 82c (or 82d) for the corresponding memory card, and are once written to the memory 83 under control of the CPU 81, and the processing then proceeds to a step S52. At this time, when the print control information is read, it is stored in the memory of the CPU 81 and is then decoded. On the other hand, if the memory card 9 is not attached, the processing is returned to the decision processing at the step S50.

The CPU 81 decides whether or not the DPOF is set in the attached memory card 9 through the decision processing at the step S52. In other words, the CPU 81 decides whether or not there is a frame in which predetermined print control information is written through the print control information recognizing section 81a based on data such as the print image information signal read at the above-mentioned step. If there is a frame in which predetermined print control information is written, the CPU 81 recognizes a frame number in which the print control information is written together with the image information signal and then decides that the DPOF is set and the processing proceeds to a subsequent step S53. On the other hand, if there is no frame in which the print control information is written, the CPU 81 decides that the DPOF is not set and the processing then proceeds to a step S54. By the processing at the step S54, the CPU 81 controls the liquid crystal controller 85 to carry out display implying that any frame has no print information and the DPOF is not set, for example, to cause the display section 2e to carry out display shown in FIG. 5B.

In the display shown in FIG. 5B, there are "DPOF" display indicating that the DPOF mode is not selected on the screen of the display section 2e, battery residual amount display and "non" display using a 7-segment display method implying that the CPOF is not set. In the case in which the display is to be carried out by using the 7-segment display method implying that the DPOF is not set, for example, the display section 2e may be caused to display any of character display of "Non" and "NON" obtained by using three 7-segments and changing large and small characters in place of "non" and "No" and "no" obtained by using two 7-segments and changing large and small characters. Moreover, the display section 2e may be caused to display using a figure "000", for example, for display implying that the DPOF is not set in place of alphabetical character display using the 7-segmenet display method. In this case, it is also possible to propose display indicative of "0"using two 7-segments or "0"using one 7-segment. As a matter of course, such display selection can be freely switched and set through a user device.

Then, the CPU 81 causes the display section 2e to carry out display implying that there is no camera reservation setting, and then returns the processing to the step S50 or the main routine.

On the other hand, if it is decided that the DPOF is set through the decision processing at the step S53, the CPU 81 causes the operating section 81*b* to calculate the total number of prints from the number of prints set to each frame number in which the print control information is written and a default value preset to a frame number in which the print control information is set based on the result of the recognition through the step S52, and controls the liquid crystal controller 85 to cause the display section 2*e* to display the total number of prints, for example, the display shown in FIG. 5A. In the display shown in FIG. 5A, there are, on the screen of the display section 2*e*, "DPOF" indicating that the DPOF mode is selected, the battery residual amount display, and "035" indicating that the total number of prints in the camera reservation setting (print control information), for example.

Then, the CPU 81 causes the processing to proceed to a subsequent step S55, recognizes an indication signal supplied through the key interface 86 by the decision processing and decides whether the print button 30*b* is pressed down or not. If the print button 30*b* is not pressed down, the decision processing is repeated until the print button 30*b* is pressed down or the processing is returned to the step S53 to display the total number of prints again and to inform the user of a print executable state. On the other hand, if the CPU 81 decides that the print button 30*b* is pressed down, it causes the processing to proceed to a subsequent step S56 and controls the print controller 87 to print a corresponding frame with the number of prints based on the decoded print control information, thereby starting the printing operation in the DPOF mode through the processing. FIG. 8 shows an example of a print start execution processing routine to be carried out at this time.

In other words, when the processing proceeds to the step S56, the CPU 81 executes the print start execution processing routine shown in FIG. 8 which is the feature of the present invention, decides whether or not at least one sheet can be printed based on the battery capacity detected from the battery controller 88 through the battery check section 81*c* before the printing operation in the DPOF mode is started through the decision processing at a next step S60. If the CPU 81 decides that the printing can be carried out, it reads image data for one sheet from the memory 83, for example, and transfers the image data to the print controller 87 at step S62 to start the printing operation, and updates print history information indicative of a print scheduling frame number and the number of prints through the processing at a subsequent step S63. This operation is repetitively executed until it is decided that the print is ended through the decision processing at a step S65.

In the meantime, the CPU 81 subtracts the total number of prints with advance of the printing operation by the operating section 81b and controls the display section 2*e* to count-down display a subtraction value through the processing at the step S63 after the printing is started. In this case, the CPU 81 subtracts, through the operating section 81b, the total number of prints based on a sucking timing signal or a discharge timing signal of the recording paper 6 which is supplied from the recording paper delivery position detecting section 89 after one sheet is completely printed, and causes the display section 2*e* to display a subtraction value for each print. FIGS. 6A to 6D show an example of display obtained at this time.

Then, it is decided that the printing operation is completed through the decision processing at the step S65, the CPU 81 displays the total number of prints (see FIG. 6D) in which camera reservation setting is carried out again through the processing at a subsequent step S66 and informs the user of the completion of the printing operation. Thereafter, the printing operation is ended through the processing at the step S65 and the processing returns to the main routine.

On the other hand, if it is decided that one sheet cannot be printed due to an insufficient capacity through the battery check carried out at the step S60, the CPU 81 causes the processing to proceed to a step S68 where the print controller 87 is controlled to once interrupt the printing operation. In this case, the battery check at the step S60 is executed based on whether at least one sheet can be printed or not. Therefore, the print interruption is not executed in the middle of one sheet printing but after one sheet for a specified print scheduling frame number is completely printed.

For example, if the print scheduling frame number subjected to the printing operation is a twenty-third print in the total number of prints, the printing operation is interrupted after the twenty-third printing is completed. FIG. 6B shows an example of display of the display section 2*e* which is obtained at this time. In other words, the CPU 81 interrupts the printing operation as described above, and at the same time, eliminates the display of the battery capacity which cannot be printed for one sheet (not shown), for example, the battery residual amount display after the flashing the battery residual amount display, thereby controlling the display such that other display is not carried out.

Then, the CPU 81 causes the processing to proceed to a step S69 where print history information indicative of a print frame number and the number of prints in the print scheduling frame number and the number of prints which are set to the print control information is stored in the print history information memory 90, and controls the print controller 88 to once drive the thermal head 20 to a save position through the processing at a step S70 and then causes the processing to proceed to a next step S71.

Through the decision processing at the step S71, it is decided whether the printing operation can be restarted or not. In other words, the CPU 81 decides whether the printing operation can be restarted or not by exchanging the battery with the battery 8 to at least clear the check of the battery check section 81*c* or charging the battery 8 to at least clear the check of the check section 81*c*. If the printing operation cannot be restarted, the CPU 81 decides whether the printing operation is forcibly ended through the decision processing at a subsequent step S72. If the printing operation is forcibly ended, the CPU 81 ends the printing operation through the processing at a next step S73 and returns the processing to the main routine. If the printing operation is not forcibly ended, the CPU 81 returns the processing to the step S71.

On the other hand, it is decided that the printing operation can be restarted, the CPU 81 causes the processing to proceed to a step S74 where the print history information stored in the print history information memory 90 is read during the print interruption, and decodes the print history information thus read. The decision processing at a next step S75 and decides whether or not the print scheduling frame number to be restarted by the operation button 30 to be the print scheduling frame number setting means and the print number setting means and the number of prints are changed. If they are changed, the CPU 81 sets such that the printing operation can be restarted from the print scheduling frame number and the number of prints thus changed through the processing at a step S77 and controls the liquid crystal controller 84 to cause the display section 2*e* to display the print scheduling frame number or the total number of prints which is newly changed, and then restarts the printing operation based on the print history information thus changed through the processing at a subsequent step S78.

Moreover, if it is decided that the print scheduling frame number to be restarted and the number of prints are not changed through the decision processing at the step S75, the CPU 81 sets such that the number of non-prints corresponding to the interrupted print scheduling frame number can be restarted based on the read print history information through the processing at a next step S76, and causes the display section 2e to display the print scheduling frame number or the total number of non-prints and then restarts the printing operation based on the print history information through the processing at a subsequent step S78.

At this time, for example, if the print scheduling frame number subjected to the printing operation during the printing interruption is a twenty-third print, the printing operation is restarted at a twenty-fourth sheet when the printing operation is to be restarted. FIG. 6C shows an example of display of the display section 2e which is obtained at this time. In other words, the CPU 81 restarts the printing operation as described above, and at the same time, controls the liquid crystal controller 84 to display the battery residual amount display indicating that the battery capacity is full, the total number of non-prints and the "DPOF" display to the display section 2e. Referring to the restart in the printer 1, the interruption is carried out after one sheet having the printing specified print scheduling frame number is fully printed. Therefore, it is not necessary to attach the recording paper 6 which is being printed. Thus, the printing operation can be restarted smoothly.

Then, the CPU 81 displays the subtraction based on the total number of prints in the same manner as the processing of the Step S64 after the printing operation is restarted through the processing at a subsequent step S79, and then returns the processing to the step S60, and carries out control to perform the battery check in the number of next prints. Thus, a series of processing routines including the battery check is repetitively executed for each print until the printing operation is completed.

While the DPOF mode is selected and executed in the example of the control operation of the CPU 81, the example is not restricted but a series of processing routines including the battery check can be executed in almost the same manner as in the case in which another print mode presetting a print scheduling frame number and the number of prints is to be executed.

(Effect)

According to the present embodiment, therefore, it is decided whether or not at least one sheet can be printed based on the battery capacity detected from the battery controller 88 through the battery check section 81c under control of the CPU 81 before the printing operation in the DPOF mode is started. If it is decided that one sheet cannot be printed due to an insufficient capacity, the operation is carried out such that the print history information indicative of the printed frame number the number of prints in the print scheduling frame number and the number of prints which are set to the print control information is stored in the print history information memory 90, the printing operation is once interrupted, the print history information is read after exchanging the battery to the new battery 8 or charging the battery, and the printing operation is restarted based on the number of non-prints corresponding to the interrupted print scheduling frame number based on the history information thus read. Therefore, a print position such as a character position is not shifted but stable printing performance can be obtained. Moreover, it is not necessary to use preventing means such as an electronic circuit part for preventing the shift in a printing position. Consequently, the size of the printer can be reduced at a low cost.

For the restart of the printing operation in the printer 1, moreover, one sheet having a print scheduling frame number for printing is completely printed and the printing operation is then interrupted. Therefore, it is not necessary to attach the recording paper 6 which is being printed, and the printing operation can be restarted smoothly and automatically. Consequently, it is also possible to enhance a user's operability.

In the printer, furthermore, the display section 2e can properly display the contents of the control, for example, the DPOF display, the total number of prints, the count-down display, the battery residual amount display, the print frame number or the number of prints during the restart of the printing operation. Therefore, the user can recognize, at sight, the contents of the control which is being executed.

Thus, it is possible to provide a high performance printer which is easy to use differently from the conventional art.

In this invention, it is apparent that working modes different in a wide range can be formed on this basis of this invention without departing from the spirit and scope of the invention. This invention is not restricted by any specific embodiment except being limited by the appended claims.

What is claimed is:

1. A printer capable of printing image information picked-up and stored through an electronic image pick-up device, comprising:

a battery for supplying a power to printer functions;

battery check means for detecting a battery capacity before a printing operation is started and for deciding whether at least one sheet can be printed or not;

storing means for storing a frame number at which the printing operation is interrupted and the number of non-prints corresponding thereto if it is decided that one sheet cannot be printed due to an insufficient battery capacity; and print control means for clearing the battery check means when the battery is recharged or replaced with a new battery, and then restarting the printing operation from the number of non-prints corresponding to the interrupted frame number.

2. The printer according to claim 1, wherein the battery can be freely attached and removed to and from the printer.

3. The printer according to claim 1, wherein the print control means serves to stop an operation of one of the function when it is decided that the battery capacity is insufficient.

4. The printer according to claim 1, further comprising print scheduling frame number setting means for setting a print scheduling frame number and print number setting means for setting the number of prints having the print scheduling frame number.

5. The printer according to claim 1, wherein a print scheduling frame number corresponding to image information to be printed and the number of prints corresponding thereto are automatically set based on image information picked up and stored by the electronic image pick-up device and print number information written corresponding to the image information.

6. The printer according to claim 5, further comprising print scheduling frame number setting means for setting a print scheduling frame number and print number setting means for setting the number of prints having the print scheduling frame number, the print scheduling frame number and the number of prints being obtained by changing the automatically set information through the print scheduling frame number setting means and the print number setting means.

7. The printer according to claim 1, further comprising print scheduling frame number setting means for setting a print scheduling frame number and print number setting means for setting the number of prints having the print scheduling frame number, the print control means controlling the operation for printing the number of non-prints corresponding the interrupted frame number based on the set print scheduling frame number and the number of prints if it is decided that one sheet cannot be printed due to an insufficient capacity.

8. The printer of claim 1 further comprising:

a socket for receiving a memory card;

a memory for storing a printing object image signal and print control information received from a memory card when the memory card is attached to the socket, wherein the printer is adapted to store the printing object image signal and print control information received from the memory card before the battery check means decides whether at least one sheet can be printed or not.

9. A printer capable of printing a plurality of print reserved image information picked-up and stored through an electronic image pick-up device, comprising:

a battery for supplying a power to printer functions;

battery check means for detecting a battery capacity before a printing operation is started and for deciding whether at least one sheet can be printed or not;

storing means for storing a frame number at which the printing operation is interrupted and the number of non-prints corresponding thereto if it is decided that one sheet cannot be printed due to an insufficient battery capacity;

display means for displaying that the battery capacity is insufficient to print one sheet when the printing operation is interrupted, and the number of printed sheets when the printing operation is interrupted; and print control means for clearing the battery check means when the battery is recharged or replaced with a new battery, and then deciding whether a print scheduling frame number and the number of sheets thereof are changed or not, displaying the changed print scheduling frame number or the number of sheets thereof on the display means if it is decided that the print scheduling frame number and the number of sheets thereof are changed and also restart the printing operation from the changed print scheduling frame number, displaying the print scheduling frame number of the number of non-prints or the total number of non-prints on the display means if it is decided that the print scheduling frame number and the number of sheets thereof are not changed, and restarting the printing operation from the number of non-prints corresponding to the interrupted frame number.

10. A printer according to claim 9, wherein the print control means serves to stop an operation of the function when it is decided that the battery capacity is insufficient.

11. A printer according to claim 9, wherein the print scheduling frame number and the number of sheets thereof are automatically set based on print reserved image information picked up and stored by the electronic image pick-up device and print number information written corresponding to the image information.

12. A printer according to claim 9, further comprising sockets to which memory cards having print control information and the image information written therein are removably attached, wherein said print control means automatically sets the print scheduling frame number and the number of sheets corresponding thereto based on said print control information when the memory cards are attached to the sockets.

* * * * *